Figure 5:
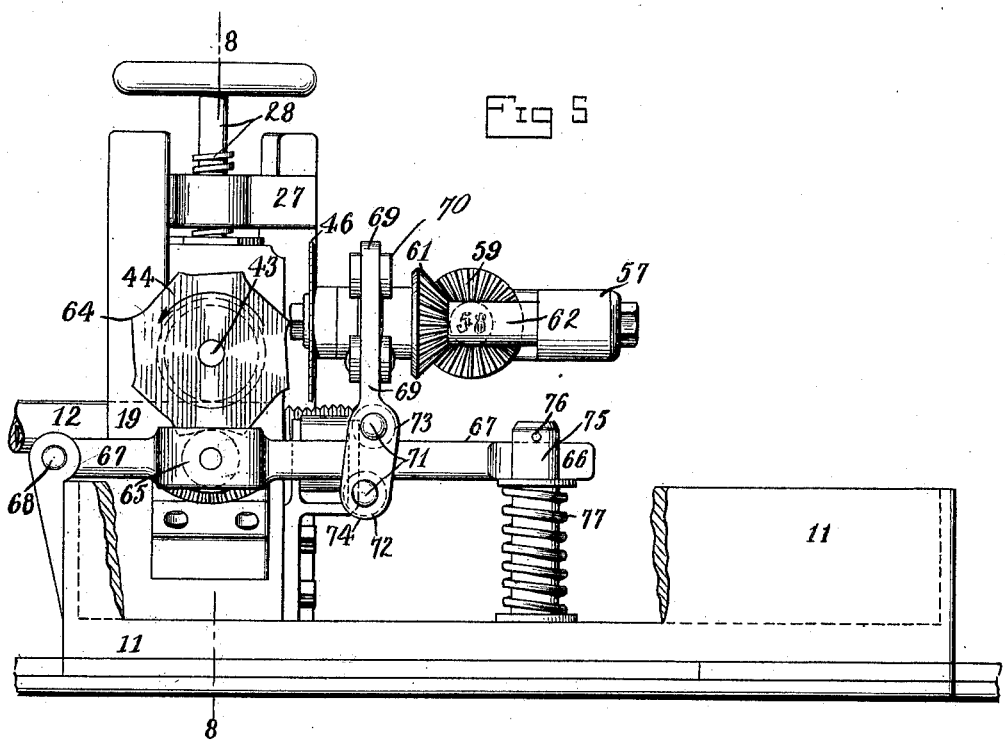

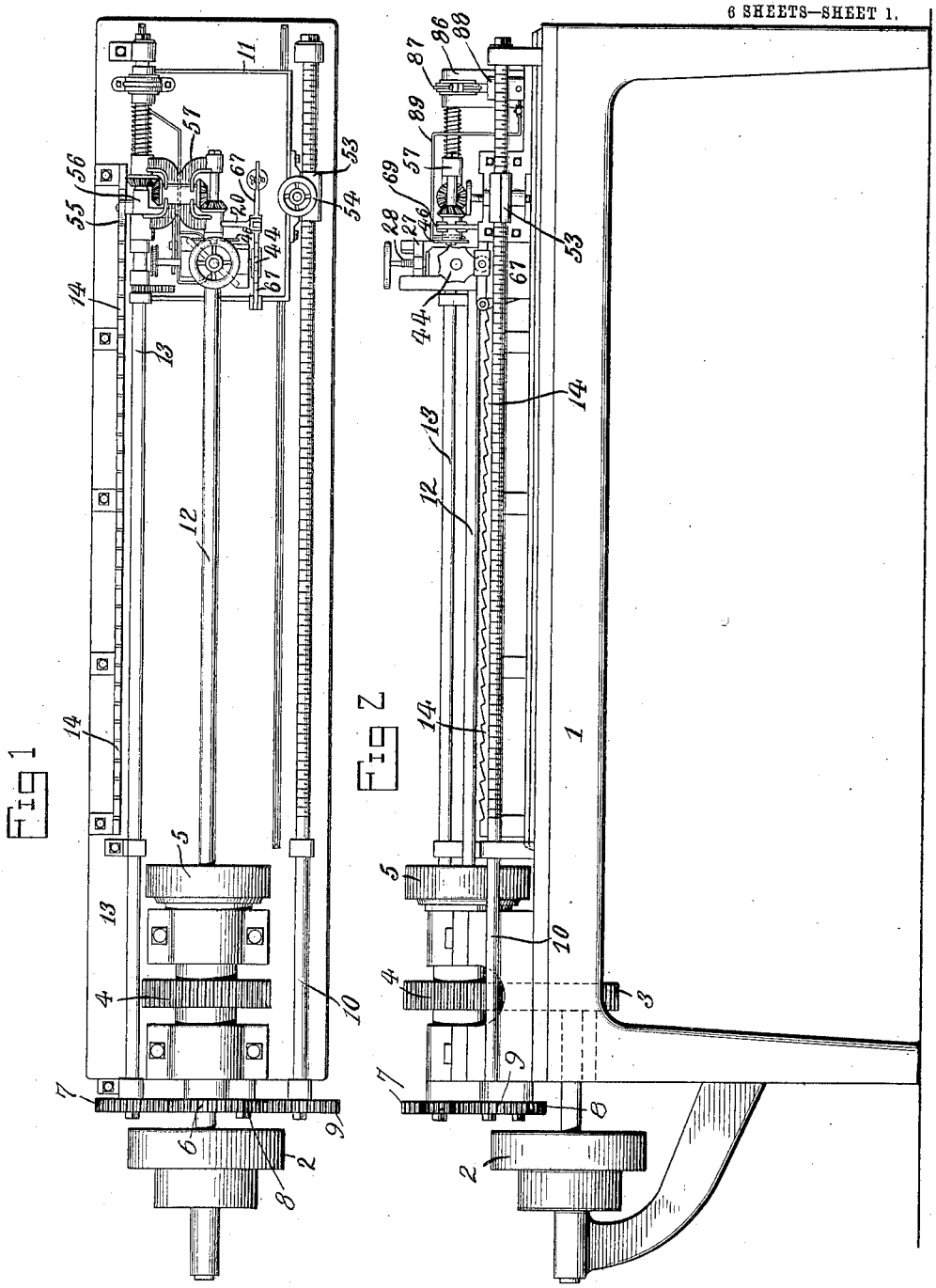

J. A. DOWD.
THREAD CUTTING MACHINE.
APPLICATION FILED AUG. 13, 1912.
1,087,739.
Patented Feb. 17, 1914.
6 SHEETS—SHEET 2.
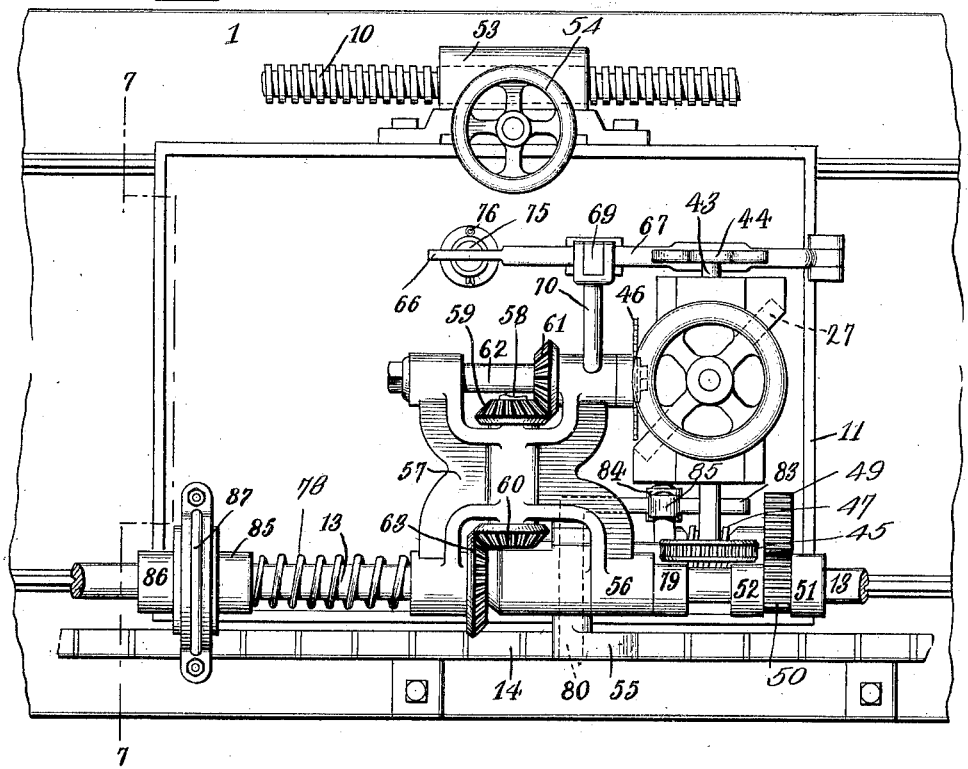
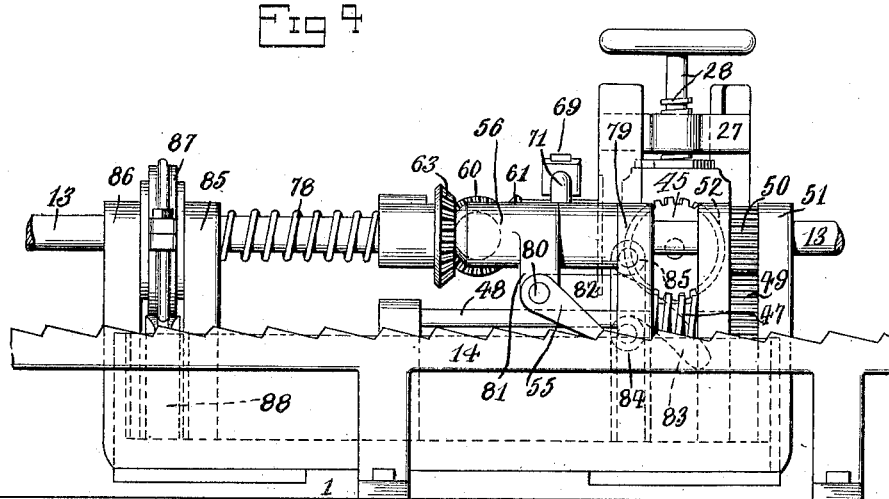
WITNESSES
E. M. Callaghan
A. L. Kitchin
INVENTOR
JOHN A. DOWD,
BY Munn & Co
ATTORNEYS

J. A. DOWD.
THREAD CUTTING MACHINE.
APPLICATION FILED AUG. 13, 1912.

1,087,739.

Patented Feb. 17, 1914.
6 SHEETS—SHEET 3.

WITNESSES
E. M. Callaghan
A. L. Kitchin

INVENTOR
John A. Dowd,
BY
ATTORNEYS

J. A. DOWD.
THREAD CUTTING MACHINE.
APPLICATION FILED AUG. 13, 1912.
1,087,739.
Patented Feb. 17, 1914.
6 SHEETS—SHEET 4.
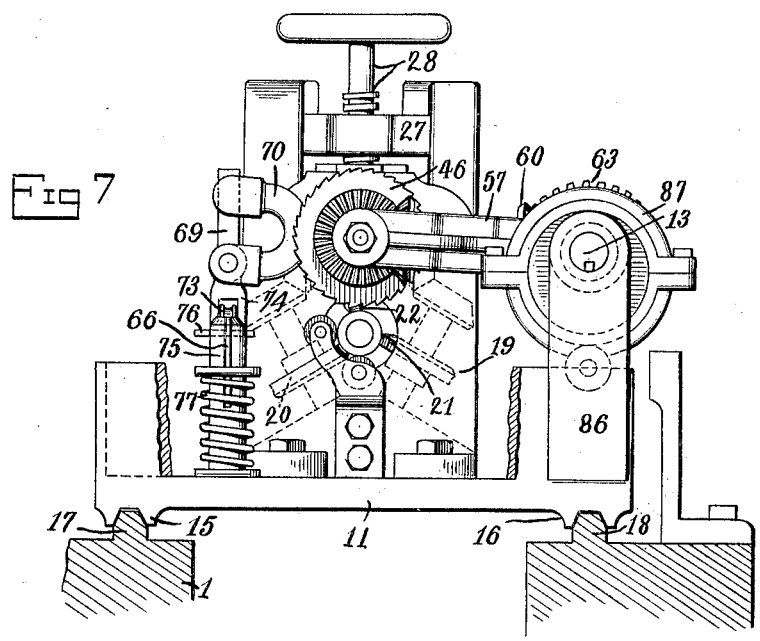
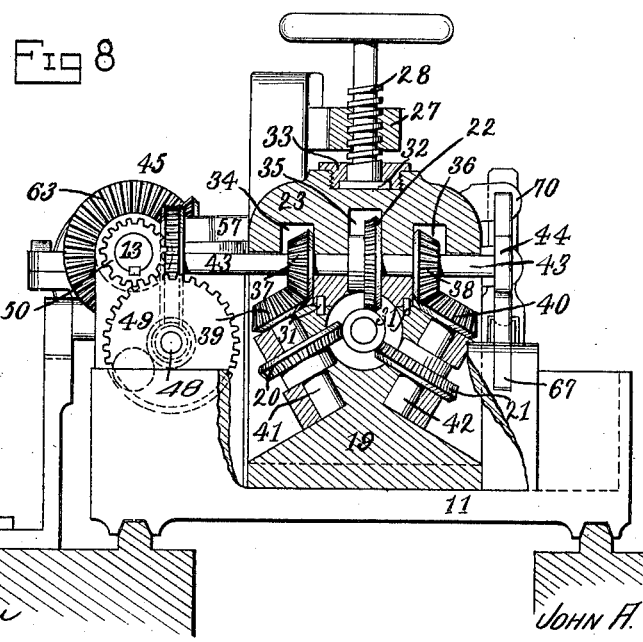
WITNESSES
E. M. Callaghan
A. L. Kitchin
INVENTOR
John A. Dowd,
BY
ATTORNEYS

J. A. DOWD.
THREAD CUTTING MACHINE.
APPLICATION FILED AUG. 13, 1912.

1,087,739.

Patented Feb. 17, 1914.
6 SHEETS—SHEET 5.

WITNESSES
E. M. Callaghan
A. L. Kitchin

INVENTOR
John A. Dowd
BY Munn & Co.
ATTORNEYS

J. A. DOWD.
THREAD CUTTING MACHINE.
APPLICATION FILED AUG. 13, 1912.
1,087,739.
Patented Feb. 17, 1914.
6 SHEETS—SHEET 6.
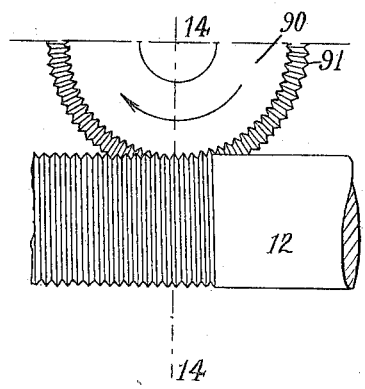
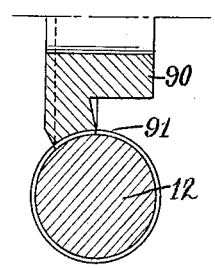
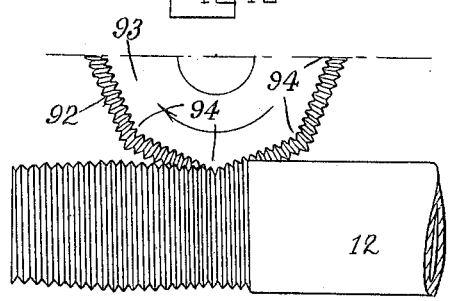
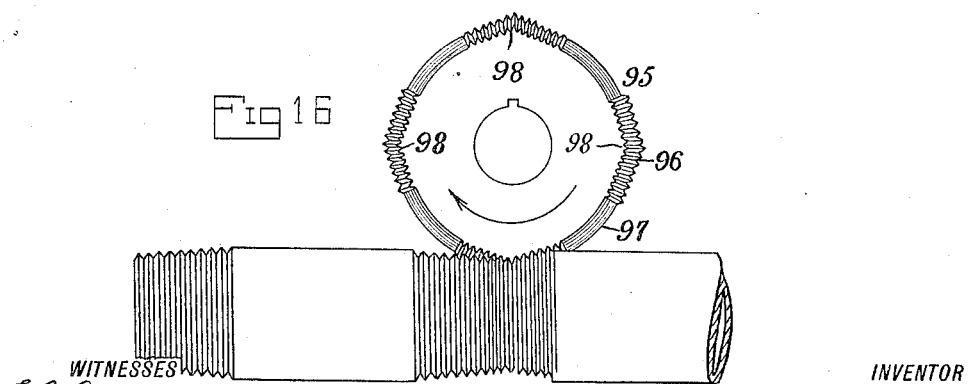
WITNESSES
E. W. Callaghan
A. L. Kitchin
INVENTOR
John A. Dowd
BY Munn & Co.
ATTORNEYS

UNITED STATES PATENT OFFICE.

JOHN ALOYSIUS DOWD, OF FALL RIVER, MASSACHUSETTS.

THREAD-CUTTING MACHINE.

1,087,739.   Specification of Letters Patent.   Patented Feb. 17, 1914.

Application filed August 13, 1912. Serial No. 714,889.

*To all whom it may concern:*

Be it known that I, JOHN A. DOWD, a citizen of the United States, and a resident of Fall River, in the county of Bristol and State of Massachusetts, have invented a new and Improved Thread-Cutting Machine, of which the following is a full, clear, and exact description.

This invention relates to improvements in machines for cutting threads upon pipes, bars, and the like, and for severing the pipes and bars in desired lengths.

The object in view is to provide an improved structure which will continually operate for threading a pipe, bar, or the like, and intermittently severing the pipe or bar into lengths.

Another object of the invention is to provide a device which may be secured to a lathe or screw cutting machine, or other similar device, which is formed with a plurality of thread cutting members for co-acting on the same bar or tube having associated therewith a saw or cutting wheel designed to cut the threaded pipe or bar into any desired length after the same has been threaded.

A still further object of the invention is to provide a thread cutting device in which the threading members are formed with thread cutting spurs arranged at different distances from the center of the tube in order to cut either straight or tapering threads on the tube or bar in a continuous operation.

In carrying out the objects of the invention, a suitable carriage is provided which carries a rotating and pivotally mounted saw of the circular type which is designed to sever a bar into lengths according to the way the device is set. Arranged on the carriage in addition to the saw, are one or more threading wheels or cutters designed to act continuously on the bar and in various manners, according to the rotation of the tool and the forward progress thereof. These cutters are formed substantially circular but may have their cutting surface arranged slightly different, as for instance perfectly round for providing a tool for cutting straight threads, or by having the threads arranged in banks at angles to each other in order to cut tapering threads without any change in any of their parts. The various banks of cutting threads may be arranged differently, as for instance, abutting or spaced apart, however, retaining the idea of some of the threads being farther from the center of the tool than others, which gives the desired taper when the tool is advanced faster than the proportionate rotation of the article being threaded.

A practical embodiment of the invention is represented in the accompanying drawings forming a part of this specification, in which similar characters of reference indicate corresponding parts in all the views.

Figure 8:
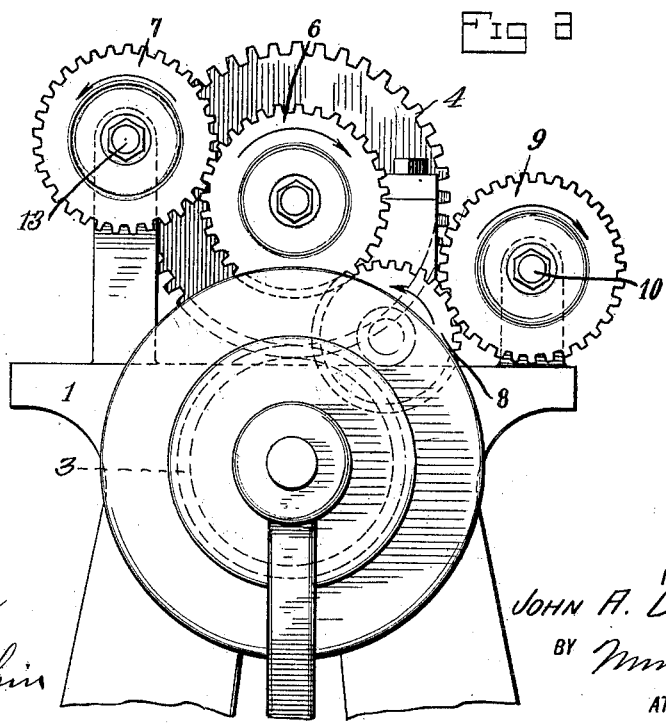
Figure 9:
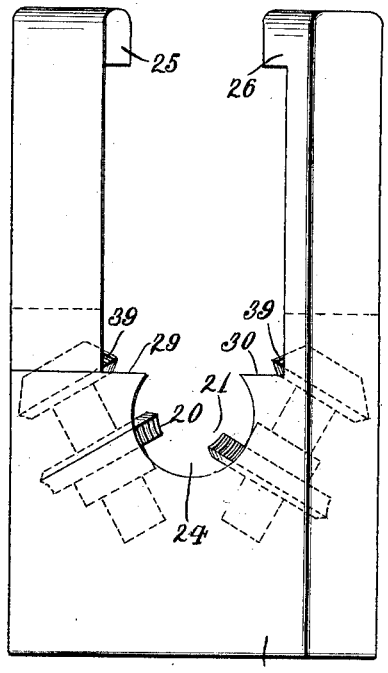
Figure 11:
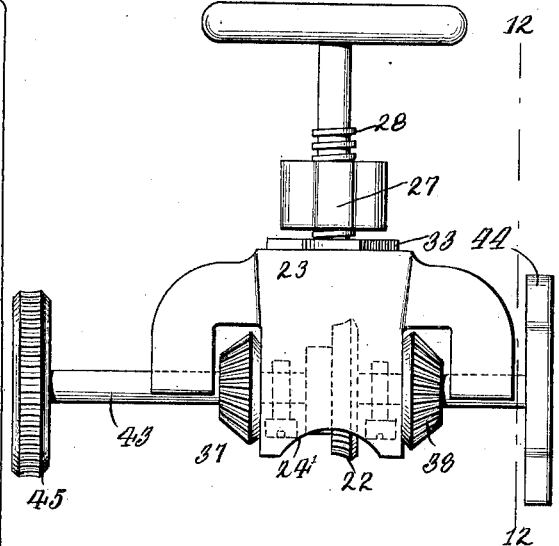
Figure 10:
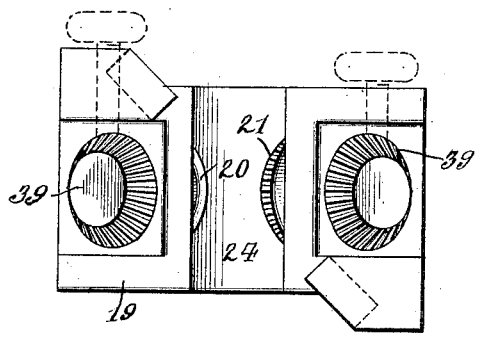
Figure 12:
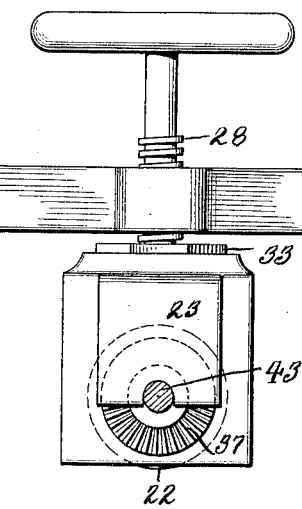

Figure 1 is a top plan view of a lathe with an embodiment of the invention applied thereto; Fig. 2 is a side view of the structure shown in Fig. 1; Fig. 3 is a top plan view of the carriage and associated parts embodying certain features of the invention; Fig. 4 is a side view of the structure shown in Fig. 3; Fig. 5 is a side view of the structure shown in Fig. 3 looking from the opposite side of the view shown in Fig. 4; Fig. 6 is an end view of a lathe showing the arrangement of gears driving the thread feed and power shaft of the attachment; Fig. 7 is a section through Fig. 3 approximately on the line 7—7; Fig. 8 is a section through Fig. 5, approximately on the line 8—8; Fig. 9 is a cutter carrying base and associated parts; Fig. 10 is a top plan view of the structure shown in Fig. 9; Fig. 11 is a side view of the cutter carrying top co-acting with the base shown in Fig. 9; Fig. 12 is a section through Fig. 11 on the line 12—12; Fig. 13 is a fragmentary view of a circular cutting tool and part of a threaded bar; Fig. 14 is a section on line 14—14 through Fig. 13; Fig. 15 is a fragmentary sectional view of a hexagonal cutter and a partially threaded pipe; and Fig. 16 is a front view of a cutter with spaced banks of threads, the same being associated with a pipe partially threaded.

Referring to the accompanying drawings by numerals, 1 indicates the ordinary bed or framework of a lathe provided with a suitable power pulley 2, connected with a gear wheel 3 which meshes with a gear wheel 4 which may be connected and disconnected from a chuck 5 in any desired way, the same not forming any part of the invention. In connection with the gear wheel 4 and in addition to the chuck 5, is a pinion 6 in connection with a pinion 7 and idler 8. The idler 8 is adapted to be brought into mesh with a gear wheel 9 so as to transmit power thereto. The gear wheel 9 has rigidly secured thereto a thread feed 10 for moving the carriage 11 at the proper speed in relation to the chuck 5. The idler 8 may be mounted on a pivotally swinging member or in any other desired way so that the same may be changed so that a larger or smaller idler may be substituted for varying the speed of the shaft 10 without varying the speed of the chuck 5 and the bar or tube 12 connected therewith. By changing the idler 8 any desired thread may be cut, using the ordinary tools heretofore in use. By using the improved attachment forming the present invention, by increasing the speed of the feed shaft 10 the length of threaded portion of bar or tube 12 may be increased, as will hereinafter be fully described. The gear wheel 7 is rigidly connected to a shaft 13 provided with a groove running for the full length thereof so as to engage the sliding keys hereinafter fully described. During the operation of the machine the shafts 10 and 13 are continually moving. Attached adjacent the shaft 13 and rigidly secured to the base or frame 1, is a rack 14 designed to co-act with a pawl and cutter and associated mechanism for causing the cutter to sever the pipe 12 into sections at certain points.

The carriage 11 is provided with suitable ways 15 and 16 for sliding on suitable beads 17 and 18 so that the carriage may freely slide back and forth. The carriage 11 has bolted or otherwise rigidly secured thereto a cutter receiving base 19 disclosed more particularly in Figs. 7, 8, and 9. This base is designed to receive cutters 20 and 21 which co-act with the thread cutter 22 mounted in a top piece or cap 23. In the drawings only three cutters have been shown but it will be evident that the base 19 and top 23 could be changed so as to accommodate a lesser or a greater number of cutters without departing from the spirit of the invention. The base member 19 is formed with an opening 24 through which the bar or tube 12 projects during the threading operation. Extending upwardly from the base 19 are a pair of hooks 25 and 26 adapted to interlock with a yoke 27 so that the yoke may act as a fulcrum against which a screw 28 will press when forcing the top or cap 23 against the shoulders 29 and 30 of the base 19. In order to cause a proper alinement of the top or cap 23, alining pins 31 are provided, as clearly shown in Fig. 8. The bottom part of the screw 28 is provided with an enlargement 32 held in place by a suitable threaded cap 33 whereby the screw 28 will be freely rotated in either direction without becoming disconnected from the cap or top 23. The top 23 is provided with apertures 34, 35, and 36 for accommodating beveled gears 37 and 38 and the cutter 22. The beveled gears 37 and 38 mesh with beveled gears 39 and 40 which are connected rigidly with shafts 41 and 42 mounted in suitable bearings formed in the bottom of the base 19. The shafts 41 and 42 carry cutters 20 and 21. The cutters 22, and 20 and 21 are all arranged to act simultaneously upon a tube or bar as the same passes through the aperture or opening 24. It will be noted from Fig. 11 that an opening 24' is provided in the cap or cover 23 which co-acts with the opening 24 for making a circular aperture when the two members are assembled.

Only three cutters have been shown in the drawings and various mechanism for rotating the same in unison, but it will be evident that more or less cutters could be used and the various gearing and supporting shafts could be changed or varied for causing all of the cutters to act simultaneously. The gear wheels 37 and 38 are rigidly secured to a shaft 43 as well as the cutter 22 so that the power will be transmitted from thence to all of the cutters. As clearly shown in Figure 8, the shaft 43 is journaled in the cap or cover 23 and extends outward therefrom in two directions so that at its ends it may receive a fluted or scalloped wheel 44 and a worm wheel 45. The scalloped wheel 44 is designed to cause the actuation of suitable mechanism for causing a saw 46 to cut off sections from the pipe or tube 12 as will be hereinafter fully described. The worm wheel 45 meshes with a suitable worm 47 rigidly secured to a shaft 48 which is mounted in suitable journals on the frame, and which has rigidly secured thereto a gear wheel 49 meshing with a gear wheel 50. The gear wheel 50 is loosely mounted on the shaft 13 and is provided with a suitable key designed to slide in the groove therein so that the carriage may freely move longitudinally of the base or frame 1 and yet allow the shaft 13 to properly rotate. The gear wheels 49 and 50 are positioned between bearing members 51 and 52, rigidly secured to the carriage 11 so that the gear wheels may properly rotate but cannot move longitudinally of the shaft 13 independently of the carriage. During the operation of the machine the shaft 13 continues to rotate so that the worm 47 will continue to rotate and power will be transferred therefrom to the cutters so that a continuous cutting operation is the result. The carriage may be allowed to run loose or may be connected with the feed shaft 10 by means of a suitable split nut 53 opened and closed by a hand member 54. This nut is of the divided type so that the same may be caused to engage and disengage the shaft 10 at will, the construction of the same forming no part of the invention, and being of the usual construction now in common use will therefore need no additional description.

As the carriage and the cutters continuously move toward the chuck 5 during the operation of the machine, it is necessary to provide some means for holding the saw 46 stationary while the same is cutting or severing the various sections of the bar or tube 12. In order to accomplish this a pivotally mounted pawl 55 engages the rack 14 and holds a sleeve 56 stationary as long as the pawl remains in engagement with the rack. Rigidly connected with the sleeve 56 and preferably forming a part thereof, is a pivotally mounted frame 57 (Fig. 3) which carries a shaft 58 having rigidly secured thereto beveled gears 59 and 60, the beveled gear 59 meshing with the beveled gear 61 rigidly secured to the shaft 62 which carries the saw 46. The gear wheel 60 meshes with the gear wheel 63 slidably mounted on the shaft 13 and connected therewith by a key designed to slide in a groove therein. As the shaft 13 is continually rotated the same transmits power through the various gears above described and to the saw 46 so that the same is continually in condition for cutting the pipe or bar 12. At the proper time one of the raised portions 64 of the scalloped wheel 44 presses the roller 65 downward and consequently lowers end 66 of bar 67 as the bar 67 is pivoted at 68 through the carriage 11. The roller 65 is journaled in the bar 67 so that when the same is depressed the bar 67 will be depressed and as the bar 67 has connected therewith a link 69 pivotally mounted to an extension 70 projecting from the frame 57, the saw 46 will be lowered upon each depression of the roller 65. As the bar 67 and the scalloped wheel 54 move with the carriage 11, the link 67 is provided with journal pins 71 from which suitable antifriction rollers 72 and 73 are fitted so that the bar 67 may freely slide through the bifurcated ends 64 of the link. A bifurcated post 75 is provided for the end 66 of the bar 67 in order to guide the movement thereof. A pin 76 is arranged in the top of the post 75 and a spring 77 is arranged beneath the bar 67 so as to normally hold the bar 67 in an elevated position and to return the bar to that position after each cutting or severing of a section from the tube or bar 12. After the scalloped wheel 44 has turned sufficiently for allowing the bar 67 to resume its raised position, as shown in Fig. 5, the pawl 55 will be raised and held raised sufficiently long for permitting the sleeve 56 to be forced by the spring 78 into engagement with a combined journal and stop 79 (Fig. 4). The pawl 55 is rigidly secured to a pivotally mounted shaft 80 journaled in an extension 81 projecting from the sleeve 56. The shaft 80 has rigidly secured thereto a bar 82 having a downwardly curved end 83 which fits over a roller 84 and is guided by a roller 85. As the carriage moves forward and the sleeve 56 remains stationary the curved end 83 will begin to move over the roller 84 and consequently move the pawl 55 slowly toward a disengaged position, but will not accomplish this until after the bar 67 has been lowered and again raised. Immediately upon the raising of bar 67 the pawl 55 will be disengaged and spring 78 will cause the forward movement of the sleeve 56 and associated parts ready for another cutting operation. By varying the distance between the raised portions 64 of the scalloped wheel 44 the speed of rotation of same and the size of the rack, the distance between the cuts or rather the lengths of the sections severed may be varied. The spring 78 presses against a combined journal and stop 85. Associated with the stop 85 is another stop 86, between which an eccentric 87 is positioned and which is connected with shaft 13 by a sliding key. The eccentric 87 is adapted to operate a pump 88 which forces oil through a pipe 89, to the cutters and any other desired point.

The detail construction of the cutters will be seen in Figs. 13 to 16 inclusive. In Figs. 13 and 14 a cutter 90 is shown having cutting threads 91 arranged in a circle, the same acting to cut the ordinary straight threads on the bar 12. In Fig. 15 a plurality of banks of cutting threads 92 are provided on a cutter 93, these banks being formed straight and meeting at points 94 whereby certain parts of each bank of cutting threads is farther from the center of the cutter 93 than other parts. This will cause the sections of the pipe 12 to be threaded with a taper, or rather with a double taper. In Fig. 16 another form of cutter 95 is provided in which banks of cutting threads 96 are provided and spaced apart by suitable smooth portions 97. Each bank of cutting threads 96 is formed with a point 98 farther from the center of the cutter 95 than the remaining part of the particular bank. The threads of the bank 96 may approach the center of the cutter 95 in the arc of a circle or on a straight line drawn at a tangent.

In operation when the cutter 90 (Fig. 13) is being used the same will continually cut a straight thread regardless of the speed of the carriage. It will of course be evident that the speed of the carriage must not be too great as the threads will not be properly formed. During the forward movement of the carriage the cutter 90 will revolve and cut with the various threads 91 during the revolution thereof, the pipe 12 of course revolving also. In order to secure the best results the cutter should not advance at a greater speed than the advancement of the thread multiplied by the number of cutters. When threaded nipples are desired in which the ends are tapered, and the thread extends for the full length of the nipple, a cutter as shown in Fig. 15 will be used. The bevel may be varied by varying the rate of advance of the carriage 11 in respect to the particular thread being cut or in other words, the rotation of the work.

In Fig. 16 another form of cutter is presented in which nipples or sections of the tube or bar may be threaded at the ends with a clear or unthreaded place between the threaded portions. Also this construction will permit the threaded ends to be cut or threaded on a bevel. It will be noticed in Fig. 16 that the unthreaded space on the cutter is not equal to the unthreaded space on the nipple or section of the tube being cut and that the taper threaded on the cutter is not equal to the length of the taper thread on the nipple. The reason for this is that if the carriage on which the cutters are mounted is advanced at a rate of speed equal to the advancement of the thread which is being cut, the cutters will cut a straight thread without revolving. If after the thread is cut the carriage should stop, the cutters would revolve backward the same as a worm gear engaged by a worm, the threaded work acting as a worm and the cutter acting as a worm gear, being of similar shape. However, if the carriage is advanced at a speed greater than the advancement of the thread which is being cut then the rotary cutters will revolve ahead and this is necessary in cutting taper threads in order to bring the different points of the cutter on the work which is being threaded. If the carriage on which the cutters are mounted is advanced at a rate of speed equal to twice the advancement of the thread, the space on the cutter will be equal to half the space on the nipple or bolt, and the length of the taper thread on the cutter will be equal to half of the taper thread or section being threaded. The cutters can be driven or advanced at any rate of speed greater than the advancement of the thread, but for practical work not greater than the advancement of the work multiplied by the number of the cutters. From this it will be seen that the various cutters may be used at different times and may be caused to advance at different speeds according to various circumstances and the particular product desired, namely, whether the sections or nipples are to be beveled on the end, and whether or not the thread is to extend from one end of the nipple to the other. It will be observed also that any desired number of cutters can be used for threading a given work, and consequently a maximum speed may be utilized without in any way injuring the work or the machine.

Several forms of cutters have been disclosed in this application in order to more clearly set forth the attachment embodying the invention, and to more clearly show how the same operates. The cutters, *per se*, have been incorporated in my co-pending applications, Serial No. 771,891 filed June 5, 1913; and Serial No. 742,212, filed January 15, 1913.

Having thus described my invention, I claim as new and desire to secure by Letters Patent:—

1. In a thread-cutting attachment; a carriage, a cutter receiving base on said carriage having a face opening; a member for coöperating with said cutter receiving base and sliding in said opening; means associated with said member for adjusting said member with reference to said cutter receiving base, a thread cutter carried by said cutter receiving base and a thread cutter carried by said member.

2. In a thread-cutting attachment, a carriage, a cutter receiving base on said carriage substantially central with same, having a face opening; a slidable member arranged in said face opening and connecting with said base; means in said member coöperating with said base for translation of said member in the opening of said base; a shaft transversely mounted in said member; a thread cutter on said shaft substantially central with said member; and a plurality of cutters in said base co-acting with the cutter in said member; means for rotating said cutters in said base when said shaft is rotated in said member.

3. In a device of the character described, the combination with a lathe or other similar machine, of an attachment for cutting threads on articles rotated by the lathe, said attachment comprising a carriage, a plurality of rotatable cutters, means secured to said carriage for supporting said cutters, means for rotating said cutters, a saw, means for pivotally supporting said saw, and a rotating member operated by the means for rotating the cutters adapted to move the saw through the threaded article.

4. In a thread-cutting attachment for lathes and similar machines, having a thread feed; an auxiliary shaft; means for driving said feed and said shaft; a carriage having means for engaging said feed for translation of said carriage; a cutter on said carriage for severing an article supported in the lathe; transmission means from said auxiliary shaft to said cutter for actuating the same; and means associated with said cutter on said lathe whereby said cutter is periodically shifted to a predetermined distance and then arrested to cut the article in the lathe.

5. In a thread cutting attachment, a carriage, means adapted to receive a power member for moving said carriage, a plurality of cutters, a support mounted on said carriage for holding the cutters in proper position, a shaft for propelling said cutters, a worm wheel connected to said shaft, a worm meshing with said worm wheel, a shaft rigidly secured to said worm for supporting the same, a gear wheel rigidly secured to said shaft, a pinion meshing with said gear wheel, and a power shaft connected with said pinion for rotating the same at a proper ratio in respect to the movement of the carriage whereby the carriage will be moved and the cutters rotated simultaneously.

6. In a thread cutting attachment, a movable carriage, means connected to said carriage adapted to receive a power transmitting member whereby the carriage is moved, a rotatable cutter, a support mounted on said carriage for supporting said cutter, a shaft for rotating said cutter, power means for connecting said power transmitting member with the cutter shaft whereby power is transmitted to the cutter shaft, a saw arranged adjacent said cutter support, means for connecting said saw with said power shaft whereby said saw is operated, and means operated by said cutter shaft for causing said saw to sever the matter being threaded by said cutter.

7. In a thread-cutting attachment for lathes, having a thread feed; an auxiliary shaft; means for driving said feed and said shaft; a carriage having means for engaging said feed for translation of said carriage; a frame slidably mounted on said auxiliary shaft and associated with said carriage; a cutter for severing an article supported in the machine carried by said frame; transmission means in said frame, from said auxiliary shaft to said cutter, for actioning said cutter; means on said carriage for raising and lowering said frame on said carriage about said auxiliary shaft as a pivot point, whereby said cutter is made to engage the article to be severed; engaging means between said cutter frame and said lathe whereby said frame is made stationary periodically with reference to said carriage; and resilient means intermediate said carriage and said frame whereby same is periodically shifted to a predetermined distance.

8. A cutter attachment for lathes and the like, comprising a carriage adapted to be moved longitudinally of the lathe, means arranged on the carriage for cutting an article held in the lathe, a saw arranged adjacent said means for severing said article into lengths, a power shaft, means for connecting said power shaft with said saw whereby the saw may be rotated, a frame pivotally mounted on said power shaft, said frame being adapted to slide within certain limits on said shaft, a spring for holding said frame normally in one position, a pawl pivotally mounted on said frame, a rack designed to engage said pawl, said rack being secured to said lathe whereby said pivotally mounted frame will not move longitudinally of said lathe while said saw is operating, and means arranged on the carriage for moving said pawl out of engagement with said rack.

9. In a cutting attachment for lathes, a carriage adapted to be moved longitudinally of the lathe continuously as long as the lathe is operating, thread cutting means mounted on said carriage and moved thereby, and an article severing mechanism arranged adjacent said thread cutting means, said article severing mechanism comprising a saw, a power shaft, means for connecting the power shaft and saw whereby the saw is continually rotated, a frame carrying said saw pivotally mounted on said power shaft and also slidingly mounted on said power shaft, a spring engaging said frame and normally holding the same in a predetermined position in respect to said frame, a pawl pivotally mounted on said frame, a rack secured to said lathe for engaging said pawl at predetermined intervals, whereby said pivotally mounted frame is held against movement notwithstanding the continued movement of said carriage whereby said spring is compressed, means operated by said thread cutting means for swinging said frame toward the article being threaded for causing said saw to sever said article, a cam member rigidly connected with said pawl, and a guiding member arranged on said carriage adapted to engage said cam member for operating the same and causing said pawl to be disengaged from said rack immediately after said saw has severed said article and when said pawl has been moved out of engagement said spring will move said pivotally mounted frame and means associated therewith to its former position in proximity to said thread cutting means.

10. In a device of the character described, the combination with a lathe designed to receive and rotate an article, a carriage mounted on said lathe, means for moving said carriage longitudinally of said lathe, threading mechanism for threading said article as said carriage is moved longitudinally of the lathe, and a cut off mechanism for severing said article into lengths, said cut off mechanism comprising a saw, means for rotating said saw, a pivotally mounted frame for supporting said saw, a link secured to one end of said frame adapted to move said saw toward and from the article to be severed, a pivotally mounted lever engaging said link for operating the same, a scalloped wheel adapted to engage said lever for lowering the same as each raised portion of the scalloped wheel engages the lever, and means for connecting the scalloped wheel with said thread cutting mechanism whereby the scalloped wheel will operate in a predetermined relationship to the operation of the thread cutting means.

11. In a device of the character described, the combination with a lathe, a carriage mounted on the lathe adapted to be moved longitudinally thereof, a thread cutting mechanism arranged on said carriage, and a cut off mechanism associated with said thread cutting mechanism for cutting the article being threaded into sections, the thread cutting mechanism comprising a cutting member, a pivotally mounted frame supporting said cutting member, a link connected with said frame for swinging said frame toward and from the article being severed, said link being bifurcated at one end, spaced bearing members arranged in said bifurcated end, a lever pivotally mounted at one end to said frame and extending between said bearing members, resilient means for holding said lever in a predetermined position and returning the same to said position when moved therefrom, an antifriction member arranged on said lever, and a scalloped wheel formed with projections adapted to engage and depress said bearing members and said lever as said scalloped wheel is rotated, said scalloped wheel being connected with said cutting mechanism whereby the thread cutting mechanism operates in a certain predetermined relationship to the operation of said severing mechanism, said scalloped wheel causing said pivotally mounted frame to move toward the article to be severed, and resilient means acting on said lever for causing said pivotally mounted frame to move away from the article to be severed.

In testimony whereof I have signed my name to this specification in the presence of two subscribing witnesses.

JOHN ALOYSIUS DOWD.

Witnesses:
ARTHUR W. DOLTON,
JOHN T. MORIARTY.

---

Copies of this patent may be obtained for five cents each, by addressing the "Commissioner of Patents, Washington, D. C."